United States Patent [19]

Huffman

[11] 3,852,058

[45] Dec. 3, 1974

[54] HERBICIDAL COMPOSITIONS AND METHODS

[75] Inventor: Clarence W. Huffman, Grandview, Ill.

[73] Assignee: Monsanto Company, St. Louis, Mo.

[22] Filed: Nov. 18, 1965

[21] Appl. No.: 508,566

Related U.S. Application Data

[63] Continuation-in-part of Ser. Nos. 108,317, May 8, 1961, abandoned, and Ser. No. 108,257, May 8, 1961, abandoned, which is a continuation-in-part of Ser. No. 661,575, May 27, 1957, abandoned.

[52] U.S. Cl. ............ 71/118, 260/562 B, 260/562 R
[51] Int. Cl. ............................................. A01n 9/20
[58] Field of Search ............................ 71/2.3, 118

[56] References Cited

UNITED STATES PATENTS

| 2,863,752 | 12/1958 | Hamm et al. | 71/2.3 |
| 3,108,038 | 10/1963 | Fielding et al. | 71/2.6 X |

FOREIGN PATENTS OR APPLICATIONS

| 1,005,784 | 4/1957 | Germany | 71/2.3 |

Primary Examiner—James O. Thomas, Jr.
Attorney, Agent, or Firm—Arnold H. Cole; Donald W. Peterson; Neal E. Willis

[57] ABSTRACT

This invention relates to compositions and methods of controlling noxious vegetation employing substituted anilides.

7 Claims, No Drawings

HERBICIDAL COMPOSITIONS AND METHODS

This application is a continuation-in-part of my prior copending applications Ser. No. 108,317, filed May 8, 1961 and Ser. No. 108,257, filed May 8, 1961, now abandoned which in turn are continuation-in-part of my prior copending application Ser. No. 661,575, filed May 27, 1957, now abandoned.

This invention relates to herbicidal compositions and to methods of controlling noxious vegetation employing substituted anilides as essential active ingredients.

Weeds may be broadly defined as undesirable plant growth. In certain places, for example, along railroad tracks, any vegetation thereon is considered a weed and complete eradication of all plants is desired. Of even greater importance is the selective control of weeds in agriculture, i.e., prevention of growth or extermination of weeds without injury to the crops. For example, grass or other plants growing within a corn field are regarded as weeds and they are difficult to remove, since corn is a member of the narrow leaf family of plants, as are the grasses. Since the physiological structures of the members of the narrow leaf family are very close, the problem of finding a chemical which has the desired specificity becomes increasingly difficult. Moreover, the selectivity of the chemical must be considered, not only with respect to the soil to which it is applied, but also to the effect of the chemical on adjacent crops which are sensitive to this chemical.

It is a primary object of this invention to provide a new and useful class of general herbicides and methods for their use. A further object of this invention is to provide methods of destroying grasses in the presence of certain broadleaf plants. A still further object is to provide a method of destroying grasses in the presence of other narrow leaf plants, such as corn. Other objects and advantages of the present invention will be apparent from the following description.

In accordance with this invention, it has been discovered that compounds of the following chemical structure possess unusual and valuable herbicidal activity:

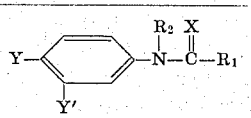

wherein X is oxygen or sulfur, Y and Y' are like or unlike halogen atoms, such as chlorine, bromine, iodine, or fluorine, and $R_1$ represents a radical selected from the group consisting of hydrogen and aliphatic radicals having up to 8 carbon atoms. Illustrative examples of aliphatic radicals are: the alkyl radicals such as methyl, ethyl, propyl, isopropyl, n-butyl, isobutyl, tertiary butyl, n-amyl, any of the branch chain amyls, any of the hexyl or heptyl radicals, and any of the octyl radicals; the alkenyl radicals such as vinyl, allyl, crotyl, methallyl, and methylvinyl, etc.; the alkynyl radicals such as propargyl, 3-butynyl, etc.; the alkoxyalkyl radicals such as methoxyethyl, ethoxyethyl, propoxyethyl, butoxypropyl, etc. $R_2$ represents a radical selected from the group consisting of $R_1$ (i.e., hydrogen and aliphatic radicals having up to 8 carbon atoms) and haloaliphatic radicals having up to 8 carbon atoms, the latter expression is intended to include the haloalkyl radicals such as chloromethyl, 2-chloroethyl, 3-chloropropyl, 3-fluoropropyl, 2,2-dichloropropyl, 2-iodopropyl, 6-bromohexyl, etc.; the haloalkenyl radicals such as 2-chloroallyl, 3-chlorocrotyl, 3-chloroallyl, 2,3-dichloroallyl, 3-chloro-2-butenyl, 3-bromoallyl, etc.; and the haloalkynyl radicals such as 2-chloropropargyl, 3-bromopropargyl, 4-chloromethylpropargyl, 4-chloro-3-butynyl, etc.

Included within the above broad class of compounds useful in the compositions and methods of this invention is a class of compounds which possess outstanding utility and are represented by the structure:

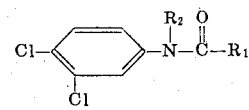

wherein $R_1$ represents an aliphatic hydrocarbon radical having from 2 to 3 carbon atoms and $R_2$ is either hydrogen or an aliphatic radical having from 2 to 3 carbon atoms. Still more preferred are those compounds in which $R_2$ is a hydrogen atom and $R_1$ is an alkyl radical. 3', 4'-dichloropropionanilide and 3', 4'-dichloroisobutyranilide are especially preferred for the purposes of this invention.

The ring-substituted anilides of this invention may be prepared by numerous methods known to the art of chemical synthesis as are specifically disclosed and discussed in prior patents and in the literature. For example, these compounds may be prepared by the reaction of an acyl chloride or anhydride with the appropriate amine. This reaction may be carried out in an alkaline aqueous suspension or in solution in an organic solvent, e.g., benzene, chloroform, or acetonitrile. The reaction which is preferably carried out in the presence of an acid acceptor is represented by the following equation:

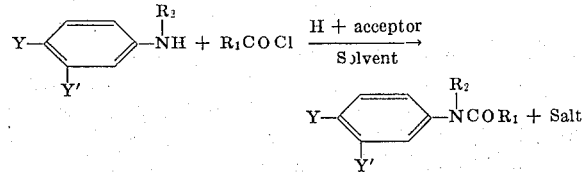

Water is added to dissolve the salt and the product usually is collected by filtration, washing and drying. The thioanilide can be prepared from the corresponding anilide by treating the anilide itself with phosphorus pentasulfide.

The active compound is, of course, applied in an amount sufficient to exert the desired herbicidal action. The amount of active compound present in the compositions as actually applied for destroying or preventing weeds, i.e., unwanted plants, will vary with the manner of application, the particular weeds for which the control is sought, the purpose for which the application is being made, and like variables. In general, the herbicidal compositions as applied will contain from about 1 percent to about 75 percent by weight of the anilides, but can contain 90 percent by weight or more of the anilides.

Valuable herbicidal effects will be observed by applications of small amounts, for example as low as one-half pound of active compound per acre, as well as high concentrations, for example 100 pounds per acre. As a general rule, the selective activity on grasses is exhibited at lower rates of application, from about 0.5 to about 10 pounds per acre. For general application and herbicidal effect on both grasses and dicotyldeonous plants, it usually will be found necessary to use amounts in the range of 10 to 50 pounds per acre. Herbicidal compositions of the invention are prepared by admixing one or more of the anilides defined heretofore in herbicidally effective amounts, with a conditioning agent of the kind used and referred to in the art as a pest control adjuvant or modifier to provide formulations adapted for ready and efficient application to soil or weeds (i.e., unwanted plants) using conventional applicator equipment.

Thus, the herbicidal compositions or formulations are prepared in the form of solids or liquids. Solid compositions for post-emergence applications can be in the form of dusts and are compounded to give homogeneous, free-flowing dusts by admixing the compound or compounds with finely-divided solids, preferably talcs, clay, lime, bentonite, pumice, fuller's earth, pyrophyllite, diatomaceous earth, or flours such as walnut shell, wheat, redwood, soya bean, cottonseed flours, and other inert solid conditioning agents or carriers of the kind conventionally employed in preparing pest control compositions in dusts or powdered form. Solid compositions for pre-emergence application are effectively formulated in granular form by methods well known to those skilled in the art. These granules, which have an optimum particle size within the range of 8 to 60 mesh are applied directly to the soil or growth media. These diluents may represent a substantial proportion, for example, 50 to 98 percent by weight of the entire formulation as applied.

Liquid compositions of the invention are prepared in the usual way by admixing one or more of the anilides with suitable liquid diluent media. With certain solvents, such as alkylated naphthalene, methyl isobutyl ketone, methyl ethyl ketone, dimethyl formamide, kerosene and cresol, respectively, high concentrations of the anilides can be obtained in solution. The proportions of such organic liquid additive will depend upon the solubility properties of the active ingredient and may require as little as 1 percent or as much as 90 percent or more in order to provide a uniformly distributed formulation.

The herbicidal compositions of the invention, whether in the form of dusts or liquids, preferably include also a surface-active agent of the kind sometimes referred to in the art as wetting, dispersing, or emulsifying agent. These agents, which will be referred to hereinafter as surface-active dispersing agents, cause the compositions to be easily dispersed in water to give aqueous sprays which, for the most part, constitute desirable compositions for application.

The surface-active dispersing agents employed can be of the anionic, cationic, or nonionic type and include, for example, sodium and potassium oleate, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol monostearate, diglycol oleate, polyethylene oxides, ethylene oxide condensation products with stearyl alcohol and octyl phenol, polyvinyl alcohols, salts, such as the acetate of polyamines from the reductive amination of ethylene/carbon monoxide polymers, laurylamine hydrochloride, laurylpyridinium bromide, stearyltrimethyl ammonium bromide, cetyldimethylbenzyl ammonium chloride, lauryl dimethylamine oxide and the like. Generally, the surface-active agents will be only a minor portion of the formulation as used, for example, less than 15 percent and frequently as low as 0.05 percent by weight of the composition. Usually, concentrations of from 0.5 to 5 percent are found to be optimum.

The herbicidal compositions are applied either as a spray or a dust to the locus or area to be protected from undesirable plant growth, commonly called weeds, i.e., plants growing where they are not wanted. Such application can be made directly upon the locus or area during the period of infestation in order to destroy existing undesirable plant growth, and/or application can be made to the locus in advance of an anticipated weed infestation to prevent such. Thus, the composition can be applied as foliar sprays and also as sprays directly to the surface of the soil. Alternatively, the dry powdered compositions can be dusted directly on the plants or dispersed in the surface soil. The phrase "applying to the soil," as used hereinafter in the specification and claims, shall be understood to refer to any method of applying the active ingredient to the soil for pre-emergence control.

Fertilizer materials, other herbicidal and other pest control agents, such as fungicides and insecticides, can be included in the herbicidal compositions of the invention if desired.

The following examples illustrate methods of preparing the anilides of this invention:

EXAMPLE A

To a benzene solution containing 161 parts by weight of 3', 4'-dichloroaniline and 116 parts by weight of triethylamine, there is added dropwise, through a condenser, 92 parts by weight of propionyl chloride. The reaction mixture is agitated and cooling employed when necessary to moderate the reaction. The mixture is refluxed until the acyl chloride odor disappears or becomes very faint. Water is then added to dissolve the precipitated triethylamine hydrochloride and the product is collected by filtration. On recrystallization from cyclohexane, there is obtained 172 parts by weight of 3', 4'-dichloropropionanilide m.p. 90.6–91.6. Analysis — calculated for $C_9H_9Cl_2NO$: C 49.6; H 4.13; Cl 32.5; N 6.42. Found: C 49.6; H 3.90; Cl 32.4; N 6.34.

EXAMPLE B

To a stirred benzene solution containing 202 parts by weight of N-allyl-3', 4'-dichloroaniline and 111 parts by weight of triethylamine, there is added dropwise, through a condenser, 97 parts by weight of propionyl chloride. The mixture is refluxed 2 hours. Water is then added to dissolve the precipitated triethylamine hydrochloride. The benzene layer is concentrated under vacuum to furnish 252 parts by weight (97 percent yield) of crude N-allyl-3',4'-dichloropropionanilide. Fractionation under vacuum and recrystallization from petroleum ether gave white crystals of the purified product melting at 71°–72°C. Analysis — calculated for $C_{12}H_{13}Cl_2NO$ (258.14): Cl 27.5; N 5.42. Found: (distilled) Cl 28.0; (crystalline) N 5.46.

EXAMPLE C

The procedure of Example A is repeated except that an equivalent amount of isobutyric acid chloride is substituted for the propionyl chloride of said example. A good yield of 3',4'-dichloroisobutyranilide is obtained.

The present invention is illustrated, but not limited, by the following examples:

EXAMPLE 1

POST-EMERGENCE OR FOLIAGE TESTS

Seeds of corn, cotton, rye grass, beans, morning-glory, and pigweed are planted in coil in boxes having an exposed area of 2 square feet. After 23 days, the crops are sprayed with an aqueous emulsion of the particular anilide at a rate of 8 pounds per acre. The emulsion is prepared by dissolving 350 m.g. of the anilide in 4 ml. of methyl isobutyl ketone, adding 12 drops of Agrimul C (an emulsifying agent sold by Napco Chemical Company which comprises a mixture of a polyoxyethylene glycol ester and an alkylaryl sulfonate), and diluting to 40 ml. with distilled water. Application of 10.0 ml. of this emulsion per square foot of soil is equivalent to 8.4 pounds of active ingredient per acre; however, since some drift loss is inevitable when spraying small areas, this rate is assumed to be 8 pounds per acre. Neither the solvent, dimethyl formamide, nor the emulsifying agent, Agrimul C, or a mixture of the two, is toxic to the crops tested.

At the time of spraying, the crops are in approximately the following stages of growth:

| | |
|---|---|
| Corn | 10–12 inches tall |
| Cotton | 2–4 inches tall, 3-leaf stage (including primary leaves) |
| Rye grass | 3–4 inches tall |
| Bindweed | 2–4 inches tall, 3–5 leaves |
| Beans | 6–10 inches tall, primary leaves mature, second trifoliate leaf about 1 inch in diameter |
| Pigweed | 3–6 inches tall, in bloom due to photoperiod effect. |

Throughout the course of the tests, the boxes are watered whenever necessary. Good growth conditions are maintained during the test period (60°–75° at night, with daytime temperatures in 75°–95° range), and the tests are terminated 21 days after spraying.

When the tests are terminated, the control crops are in approximately the following stages of growth:

| | |
|---|---|
| Corn | 24–36 inches tall |
| Cotton | 8–10 inches tall, 7 leaves |
| Rye grass | 6–10 inches tall |
| Bindweed | 6 inches tall |
| Beans | 12–18 inches tall, active blooming, many small pods developed |
| Pigweed | 12–16 inches tall, nearly mature |

The results of such tests are given in Table I, below. Percent stand (%S) is a measure of the number of growing plants in the crops sprayed with the active ingredient as compared to the number of growing plants in the untreated control crops. Percent yield (%Y) is a measure of the weight of plant growth produced with the spray treatment as compared to the weight of crops produced without the spray treatment.

TABLE I

| | Corn | | Cotton | | Rye grass | | Bindweed | | Beans | | Pigweed | |
|---|---|---|---|---|---|---|---|---|---|---|---|---|
| | %S | %Y | %S | %Y | %S | %Y | %S | %Y | %S | %Y | %S | %Y |
| 3',4'-dichloro-propionanilide | 0 | 0 | 0 | 0 | 10 | 5 | 0 | 0 | 0 | 0 | 0 | 0 |
| 3',4'-dichloroiso-butyranilide | 0 | 0 | 0 | 0 | 0 | 0 | 0 | 0 | 0 | 0 | 0 | 0 |
| 3',4'-dichloro acetanilide | 60 | 30 | 100 | 75 | 100 | 75 | 0 | 0 | 50 | 5 | 0 | 0 |
| 3',4'-dichloro-n-butyranilide | 75 | 35 | 100 | 75 | 100 | 75 | 25 | 10 | 20 | 2 | 0 | 0 |
| 3',4'-dichloroiso-valeranilide | 75 | 35 | 100 | 75 | 100 | 100 | 0 | 0 | 50 | 5 | 0 | 0 |
| 3',4'-dichloro-valeranilide | 60 | 30 | 100 | 75 | 100 | 100 | 30 | 10 | 50 | 5 | 0 | 0 |
| 3',4'-dichloro-enanthanilide | 70 | 50 | 100 | 100 | 100 | 100 | 100 | 100 | 100 | 85 | 0 | 0 |
| 3',4'-dichloro-formanilide | 100 | 100 | 20 | 10 | 100 | 0 | | | | | | |
| 20 | 10 | 100 | 30 | 0 | 0 | | | | | | | |

The herbicidal efficiency of the present compounds is surprising, for related compounds possess little or no herbicidal efficiency. When tested as described above, aqueous emulsions of a random group of such compounds are found to possess little or no herbicidal activity. Some of the compounds tested are set forth below:

3'-chloroisobutyranilide
3'-chloroacetanilide
4'-bromo-2'-phenylacetanilide
2',4'-dichloropropionanilide
2',4'-dichloroisobutyranilide
2',4',5'-trichloroisobutyranilide
3',4'-dichlorolauranilide
2',4'-dimethylpropionanilide
N-methylacetanilide N-n-butylacetanilide
p-chloroacetylacetanilide
2-chloro-2',4'-dimethylpropionanilide In the following examples, tables of herbicidal evaluation data are presented in which the plants are represented by letters as follows:

| Code | Plant Name | Plant Family | Genus | Species |
|------|------------|--------------|-------|---------|
| A | Wild Oat | Graminae | Avena | fatua |
| B | Brome Grass | do. | Bromus | tectorum |
| C | Barnyard Grass | do. | Echinochloa | crusgalli |
| D | Rye Grass | do. | Lolium | perenne |
| E | Crabgrass | do. | Digitaria | sanguinalis |
| F | Mustard(Radish) | Cruciferae | Raphanus | sativus |
| G | Sugar Beet | Chenopodiacae | Beta | vulgaris |
| H | Cotton | Malvaceae | Gossypium | herbaceum |
| I | Pigweed | Amaranthaceae | Amaranthus | retroflexus |
| J | Corn | Graminae | Zea | maize |
| K | Buckwheat | Polygonaceae | Polygonum | convolvulus |
| L | Morning Glory | Convolvulaceae | Ipomoea | hederacea |
| M | Foxtail | Graminae | Setaria | faberii |
| N | Field Bindweed | Convolvulaceae | Convolvulus | arvensis |
| O | Soybean | Leguminosae | Soja | max |
| P | Tomato | Solanacae | Lycopersicum | esculentum |
| Q | Sorghum | Graminae | Sorghum | vulgare |
| R | Rice | do. | Oryza | sativa |
| S | Flax | Linaceae | Linum | usitatissimum |
| T | Alfalfa | Leguminosae | Medicago | sativa |
| U | Horsenettle | Solanacae | Solanum | carolinense |
| V | Climbing Milkweed | Asclepiadaceae | Ampelamus | albidus |
| W | Spurge | Euphorbiaceae | Euphorbia | sopina |
| X | Carpetweed | Aizoaceae | Mollugo | verticillata |
| Y | Lambsquarter | Chenpodiacae | Chenopodium | album |
| Z | Smartweed | Polygonaceae | Polygonum | pennsylvanicum |
| a | Cheat grass | Graminae | Bromus | secalinus |
| b | Oats | do. | Avena | sativa |
| c | Wheat | do. | Triticum | vulgare |
| d | Cucumber | Cucurbitaceae | Cucumis | sativa |
| e | Snap bean | Leguminosae | Phaseolus | vulgaris |

EXAMPLE 2

POST-EMERGENCE GREENHOUSE TEST

In the following table 3',4'-dichloropropionanilide, N-allyl-3',4'-dichloropropionanilide and 3',4'-dichlorothiopropionanilide are tested at various rates by spraying greenhouse flats (aluminum pans 9½ inch × 5¼ inch × 2¾ inch) containing the various plants listed in Table II below with aqueous compositions containing varying concentrations of these 3',4'-dichloroanilides. At the time of spraying the plants are 21 days old.

Throughout the course of the tests, the flats are watered whenever necessary. Good growth conditions are maintained during the test period. The tests are terminated 14 days after the chemical is applied and the results are observed and recorded.

The relative value of the compound with respect to its herbicidal effect on broadleaf and narrow leaf plants is indicated by number as follows:

| | |
|---|---|
| 0 | No phytotoxicity |
| 1 | Slight phytotoxicity |
| 2 | Moderate phytotoxicity |
| 3 | Severe phytotoxicity |
| 4 | Dead |

EXAMPLE 3

POST-EMERGENCE FIELD TESTS

Field test data is obtained on 3',4'-dichloropropionanilide by spraying 13 crops and 11 weed plants at two growth stages (2 and 4 weeks old). The rates of application employed are 2 lbs. per acre and 8 lbs. per acre. This is obtained by spraying 30 gallons of the aqueous solution per acre and varying the

TABLE II

| | | Post-Emergence Rating |
|---|---|---|
| Compound | Rate lbs. per acre | A B C D E F G H I J K L M N O P Q R |
| 3',4'-dichloropropionanilide | 9.5 | 4 4 4 4 4 4 4 4 4 3 4 4 4 4 4 4 4 0 |
| do. | 4 | 1 3 — 1 4 4 4 4 4 4 4 4 — — 4 2 0 |
| do. | 1 | 2 2 — 0 4 4 4 0 4 1 4 3 4 — — 4 3 0 |
| N-allyl-3',4'-dichloropropionanilide | 9.5 | 4 — — 2 3 4 4 4 — 3 4 — — — 4 — — — — |
| do. | 4 | 1 — — 0 2 2 3 2 — 1 3 — — 2 — — — — |
| do. | 3 | — — — 0 2 2 2 0 — 0 2 — — 2 — — — — |
| 3',4'-dichlorothiopropionanilide | 9.5 | 3 3 — 4 4 4 4 — 4 — 4 4 4 — 4 2 3 — |
| do. | 4 | 3 3 — 2 4 4 3 — 4 — 4 3 4 — 4 1 4 — |
| do. | 1 | 2 2 — 1 2 3 3 — 4 — 4 2 2 — 3 0 3 — |

Similar results are obtained when 3',4'-dichloroisobutyranilide and 3',4'-dichloromethacrylyl-anilide are tested in the same manner.
(NOTE: the dash mark (—) denotes that the particular plant was not included in the test at the indicated rate.)

concentration of the 3',4'-dichloropropionanilide. The water dispersible powder formulation of Example 6 (i.e., Formulation A) is utilized in this test.

After 9 days the 4-week old plants are examined for herbicidal effects and the results recorded. The data on the 2-week old plants is taken 13 days after spraying.

The contact rating code for the field tests is as follows:

| | |
|---|---|
| 6 | Complete kill |
| 5 | Extreme injury |
| 4 | Severe injury |
| 3 | Moderate injury |
| 2 | Slight injury |
| 1 | No injury |
| 0 | No injury | varying the concentration of the anilide in the composition applied to the soil.

The tests are terminated 14 days after application and the results are observed and recorded.

The relative value of the compound with respect to its herbicidal effect on the various plants is indicated by a number as follows:

| | |
|---|---|
| 0 | No phytotoxicity |
| 1 | Slight phytotoxicity |
| 2 | Moderate phytotoxicity |
| 3 | Severe phytotoxicity |

The following table of observed data demonstrates the selective phytotoxicity of the compounds tested:

TABLE IV

| Compound | Rate lbs. per acre | A B C D E F G H I J K L M N O P Q R |
|---|---|---|
| 3', 4'-dichloropropion-anilide | 10 | 1 3 3 1 3 3 3 0 3 0 3 0 0 1 — — — — |
| do. | 4 | 0 1 0 0 0 2 0 1 3 0 0 0 0 0 — — — — |
| do. | 3 | 0 0 3 0 3 0 0 — 3 — 0 0 3 0 0 0 0 0 |
| N-allyl-3',4'-dichloro-propionanilide | 10 | 1 2 3 2 3 3 3 0 3 0 3 0 2 — — — — — |
| do. | 5 | 1 2 2 0 2 1 3 0 3 0 1 0 1 — — — — — |

General herbicidal effects are obtained when the above compounds are retested at 25 pounds per acre.

TABLE III

Post-Emergence Field Test Data

| Crops Code designation | 2-week plants | | 4-week plants | |
|---|---|---|---|---|
| | 8 lbs/acre | 2 lbs/acre | 8 lbs/acre | 2 lbs/acre |
| G | 6 | 6 | 6 | 3 |
| H | 6 | 6 | 6 | 2 |
| J | 6 | 3 | 4 | 3 |
| K | 6 | 6 | 5 | 4 |
| O | 6 | 5 | 6 | 4 |
| P | 6 | 6 | 2 | 1 |
| Q | 6 | 4 | 4 | 3 |
| S | 6 | 5 | 5 | 1 |
| T | 6 | 6 | 4 | 3 |
| e | 6 | 6 | 6 | 5 |
| b | 6 | 4 | 5 | 1 |
| c | 5 | 1 | 4 | 2 |
| d | 6 | 4 | 5 | 2 |
| Weeds | | | | |
| a | — | — | 6 | — |
| E | 6 | 6 | 6 | 2 |
| I | 6 | 6 | 6 | 4 |
| L | 6 | 4 | — | 2 |
| M | 6 | 6 | 6 | 3 |
| U | — | — | 2 | 0 |
| V | — | — | 2 | 2 |
| W | 6 | — | 6 | — |
| X | 6 | 6 | 4 | 2 |
| Y | — | — | 6 | — |
| Z | — | — | 4 | 4 |

EXAMPLE 4
PRE-EMERGENCE TESTS

The relative value of several of the anilides as pre-emergence herbicides is determined by planting in greenhouse flats, seeds of eleven different plants, each representing a principal botanical type. The flats are treated with the various herbicides at different rates by Similar results are obtained with 3',4'-dichloroisobutyranilide.

EXAMPLE 5
Dust Formulations

The following compositions are adapted for direct application as dusts for the destruction or prevention of weeds using conventional dusting equipment. The dusts are mixed by blending or mixing the ingredients and grinding the mix to give compositions having an average particle size less than about 50 microns.

A
| | |
|---|---|
| 3',4'-dichloropropionilide | 20 |
| talc | 80 |
| | 100 |

B
| | |
|---|---|
| 3',4'-dichloroisobutyranilide | 5 |
| pyrophyllite | 95 |
| | 100 |

C
| | |
|---|---|
| N-allyl-3',4'-dichloropropion-anilide | 20 |
| talc | 80 |
| | 100 |

EXAMPLE 6

Water-Dispersible Powders

The following powdered compositions are adapted for dispersing in water for application as a spray for the destruction and prevention of weeds. The powdered compositions are made by intimately mixing the listed ingredients, using conventional mixing or blending equipment, and then grinding the mixture to give a powder.

A
| | |
|---|---|
| 3',4'-dichloropropionanilide | 50 |
| sodium dodecyl benzene sulfonate | 5 |
| sodium citrate dihydrate | 3 |
| disodium phosphate | 2 |
| attapulgite | 40 |
| | 100 |

B
| | |
|---|---|
| 3',4'-dichloroisobutyranilide | 60 |
| sodium disulfonate of dibutylphenyl-phenol | 3 |
| bentonite | 37 |
| | 100 |

C
| | |
|---|---|
| N-allyl-3',4'-dichloropropion-anilide | 50 |
| sodium dodecyl benzene sulfonate | 5 |
| sodium citrate dihydrate | 3 |
| disodium phosphate | 2 |
| attapulgite | 40 |
| | 100 |

EXAMPLE 7

Water-Dispersible Liquid Compositions

The following compositions are in liquid form and are adapted to give aqueous dispersions for applications as sprays. In the case of some of the anilides, the compositions will not be complete solutions, but, in part, dispersions of solid in the solvent used. The liquid or fluid compositions shown are prepared by thoroughly mixing or dispersing the active compounds and one or more conditioning agents, such as dispersing or emulsifying agents, in an organic solvent.

A
| | |
|---|---|
| 3',4'-dichloropropionanilide | 39 |

-Continued

A
| | |
|---|---|
| alkylated aryl polyether alcohol (wetting and dispersing agent) | 8 |
| methyl isobutyl ketone | 53 |
| | 100 |

B
| | |
|---|---|
| 3',4'-dichloroisobutyranilide | 23 |
| long-chain fatty alcohol sulfate (emulsifying agent) | 5 |
| methyl cellulose (dispersing agent) | 2 |
| methyl ethyl ketone | 70 |
| | 100 |

C
| | |
|---|---|
| N-allyl-3',4'-dichloropropion-anilide | 39 |
| alkylated aryl polyether alcohol (wetting and dispersing agent) | 8 |
| methyl isobutyl ketone | 53 |
| | 100 |

The following compounds are given as further examples of anilides employed in the compositions and methods of this invention, and it will be understood that such compounds can be used in place of the various compounds specifically shown in the foregoing detailed examples.

1. 3'-chloro-4'-iodopropionanilide
2. 3'-bromo-4'-fluoropropionanilide
3. 3',4'-diiodoisobutyranilide
4. 3',4'-dibromocapyrylanilide
5. 3',4'-dichloroenanthanilide
6. 3',4'-dichloroacrylanilide
7. 3',4'-dichloromethacrylanilide
8. 3',4'-dichlorocrotonanilide
9. 3',4'-difluoropropionanilide
10. 3',4'-dichlorotetrolanilide
11. 3',4'-dichloro-3-butynanilide
12. 3',4'-dibromothiovaleranilide
13. 3',4'-diiodocapyrylanilide
14. 3',4'-dibromoisocrotonanilide
15. 3'-chloro-4'-bromoisobutyranilide
16. 3',4'-dichlorothiopropionanilide  17. 3',4'-dichlorothiobutyranilide
18. 3',4'-dibromothiopropionanilide
19. 3',4'-dichloro-2-ethoxyacetanilide
20. 3',4'-dichloro-2-methoxyacetanilide
21. 3',4'-dichloro-3-methoxypropionanilide
22. 3',4'-dichloro-4-methoxythiobutyranilide
23. 3',4'-dichloro-5-methoxyvaleranilide
24. 3',4'-dichloro-7-methoxyenanthanilide
25. 3',4'-dichloro-2-butoxyacetanilide
26. 3',4'-dichloro-2-ethoxythioacetanilide
27. 3',4'-dichloro-3-ethoxypropionanilide
28. 3',4'-dichloro-4-ethoxybutyranilide
29. 3',4'-dichloro-3-ethoxyisobutyranilide
30. 3',4'-dichloro-2-propoxythioacetanilide
31. 3',4'-dichloro-3-propoxypropionanilide
32. 3',4'-dichlorothioisobutyranilide
33. 3',4'-dichloroisohexanilide
34. 3',4'-dichlorohexenanilide
35. 3',4'-dichlorovaleranilide
36. 3',4'-dichlorothiovaleranilide
37. 3',4'-dichloroisovaleranilide
38. 3',4'-dichlorothioacrylanilide
39. 3',4'-dichlorothiomethacrylanilide
40. 3',4'-dibromotetrolanilide
41. 3',4'-dichlorocaproylanilide
42. 3',4'-dibromoisohexanilide 43. 3',4'-dichloro-2-methylcaproylanilide
44. 3',4'-dichlorothiocapranilide
45. N-allyl-3',4'-dichlorotetrolanilide
46. N-methyl-3',4'-dichlorobutyranilide
47. N-methyl-3',4'-dichloroisobutyranilide
48. N-methyl-3',4'-dichloropropionanilide
49. N-methyl-3',4'-dibromocapyrylanilide
50. N-allyl-3',4'-dichlorothiopropionanilide
51. N-allyl-3',4'-dichloroisovaleranilide
52. N-allyl-3',4'-dichloroacrylylanilide
53. N-allyl-3',4'-dichloromethacrylylanilide
54. N-allyl-3',4'-dibromotetrolanilide
55. N-allyl-3',4'-dichloropropionanilide
56. N-methallyl-3',4'-dichloropropionanilide
57. N-methallyl-3',4'-dichlorobutyranilide
58. N-crotyl-3',4'-dichloropropionanilide
59. N-methallyl-3',4'-dichlorothiopropionanilide
60. N-propargyl-3',4'-dichloropropionanilide
61. N-propargyl-3',4'-dichloroisobutyranilide
62. N-ethyl-3',4'-dibromopropionanilide
63. N-ethyl-3',4'-dichlorobutynanilide
64. N-ethyl-3',4'-dichlorothiopropionanilide
65. N-ethyl-3',4'-dichloroacrylylanilide
66. N-ethyl-3',4'-dichloropropionanilide
67. N-ethyl-3',4'-dichlorothioacrylylanilide
68. N-isoamyl-3',4'-dichloropropionanilide
69. N-butyl-3',4'-dichloropropionanilide
70. N-butyl-3'-chloro-4'-bromopropionanilide
71. N-butyl-3',4'-dichloropropionanilide
72. N-butyl-3',4'-dichlorocaprylanilide
73. N-butyl-3',4'-dibromopropionanilide
74. N-butyl-3',4'-dibromoisobutyranilide
75. N-crotyl-3',4'-dichloropropionanilide
76. N-crotyl-3',4'-dichloroenanthanilide
77. N-crotyl-3',4'-dichloroacrylylanilide
78. N-crotyl-3',4'-dichloromethacrylylanilide
79. N-crotyl-3',4'-dichloropropionanilide
80. N-crotyl-3',4'-dichloropropionanilide
81. N-allyl-3',4'-dichlorocaprylanilide
82. N-allyl-3',4'-dichlorocaproylanilide
83. N-propargyl-3',4'-dichloroisocrotonanilide
84. N-2-ethylhexyl-3',4'-dichloropropionanilide
85. N-2-ethylhexyl-3',4'-dichloroisobutyranilide
86. N-2-ethylhexyl-3',4'-dichlorobutyranilide
87. N-propyl-3',4'-dichloropropionanilide
88. N-propyl-3',4'-dichlorothiopropionanilide
89. N-propyl-3',4'-dichlorobutyranilide
90. N-propyl-3',4'-dichloroisothiobutyranilide
91. N-propyl-3',4'-dichloroisopropionanilide
92. N-isopropyl-3',4'-dichloroacrylylanilide
93. N-isopropyl-3',4'-dichloromethacrylylanilide
94. N-isopropyl-3',4'-dichloropropionanilide
95. N-isopropyl-3',4'-dichlorothiopropionanilide
96. N-2-chloroethyl-3',4'-dichloropropionanilide
97. N-2-chloroethyl-3',4'-dichlorothiopropionanilide
98. N-2-chloroethyl-3',4'-dichloroisobutyranilide
99. N-2-bromopropyl-3',4'-dichloropropionanilide
100. N-2-ethoxyethyl-3',4'-dichloropropionanilide
101. N-3-chloroallyl-3',4'-dichloropropionanilide
102. N-2-chloropropargyl-3',4'-dichloropropionanilide
103. N-2,3-dichloroallyl-3',4'-dichloropropionanilide
104. N-2-iodoallyl-3',4'-dichloroisobutyranilide
105. N-3-methoxypropyl-3',4'-dichloropropionanilide
106. N-3-butoxypropyl-3',4'-dichloroisopropionanilide
107. N-3-bromopropargyl-3',4'-dichloropropionanilide
108. N-3-chlorocrotyl-3',4'-dichloropropionanilide
109. N-4-chloro-3-butynyl-3',4'dichloropropionanilide
110. N-2-butoxyethyl-3',4'-dichloropropionanilide
111. N-crotyl-3',4'-dichlorothioisobutyranilide
112. N-2-ethoxyhexyl-3',4'-dichlorothiopropionanilide
113. N-2-chloroallyl-3',4'-dichlorothiopropionanilide
114. N-2-chloroallyl-3',4'-dichloroisobutyranilide
115. N-2-ethylhexyl-3',4'-dichlorothiomethacrylylanilide While this invention has been described with respect to certain embodiments, it is not so limited and it is to be understood that variations and modifications thereof obvious to those skilled in the art may be made without departing from the spirit or scope of this invention.

What is claimed is:

1. Method of inhibiting the growth of plants which comprises applying thereto in an effective inhibiting amount a compound of the formula:

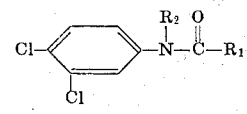

wherein $R_1$ and $R_2$ are lower alkyl.

2. A method as defined in claim 1 wherein the compound is N-methyl-3',4'-dichloropropionanilide.

3. A method of controlling the growth of undesirable plants which comprises applying to the plants a herbicidally effective amount of a compound of the formula

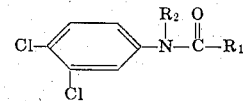

wherein $R_1$ is alkyl having from 2 to 3 carbon atoms, and $R_2$ is alkenyl having from 2 to 3 carbon atoms.

4. A method of controlling the growth of undesirable plants which comprises applying to the plants a herbicidally effective amount of a compound of the formula

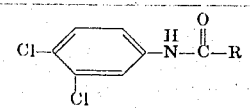

wherein R is alkyl or alkenyl having 3 carbon atoms.

5. A method as defined in claim 4 wherein the compound is 3',4'-dichloroisobutyranilide.

6. A method as defined in claim 4 wherein the compound is 3',4'-dichloromethacrylanilide.

7. A method as defined in claim 3 wherein the compound is N-allyl-3',4'-dichloropropionanilide.

* * * * *